United States Patent [19]
Caires

[11] Patent Number: 5,590,734
[45] Date of Patent: Jan. 7, 1997

[54] VEHICLE AND METHOD OF DRIVING THE SAME

[76] Inventor: Richard Caires, 12 Kingdom Ridge Rd., Bedford, N.Y. 10506

[21] Appl. No.: 362,243

[22] Filed: Dec. 22, 1994

[51] Int. Cl.⁶ .................................................. B60K 1/00
[52] U.S. Cl. ........................... 180/165; 180/65.3; 310/12
[58] Field of Search ..................... 180/165, 65.1, 180/65.2, 65.3, 305, 307; 290/1 R; 322/3; 310/12, 15

[56] References Cited

U.S. PATENT DOCUMENTS 3,559,027  1/1971  Arsem ..................................... 180/65.3
4,032,829  6/1977  Schenavar ............................... 180/65.3
4,295,538  10/1981  Lewus ..................................... 180/165
5,167,292  12/1992  Moiroux et al. ......................... 180/165

Primary Examiner—Richard M. Camby
Attorney, Agent, or Firm—Michael J. Striker

[57] ABSTRACT

In a vehicle and a method of driving the same, an additional power is produced from a relative vertical displacement between the ground engaging means and the body of the vehicle and supplied to the drive of the vehicle.

5 Claims, 2 Drawing Sheets

VEHICLE AND METHOD OF DRIVING THE SAME

BACKGROUND OF THE INVENTION

The present invention generally relates to vehicles and methods of driving the vehicles.

All known vehicles have a body and ground engaging means formed for example as wheels which support the body and are movable relative to the ground together with the body to move the vehicle in a traveling direction. The vehicles have driving means which drive the ground engaging means in the traveling direction and can be formed for example as electrically powered driving means, internal combustion engines, etc.

As the vehicle travels even on a smooth road, relative displacement occurs between the body and the ground engaging means for example between the chassis and the wheels of the vehicle due to unevenness of the roadway. When the tire of the vehicle moves over an upward projection or a downward depression of the roadway, the wheel axle displaces correspondingly upwardly or downwardly relative to the chassis. This displacement has never been used for conversion into an additional energy which can be utilized for driving the vehicle.

SUMMARY OF THE INVENTION

Accordingly, it is an object of the present invention to provide a vehicle and a method of driving the same, in which the substantially vertical displacement between the vehicle body and the vehicle ground engaging means is converted into an energy which is utilized for driving the vehicle.

In keeping with these objects and with others which will become apparent hereinafter, one feature of the present invention resides, briefly stated, in a vehicle which has a body, ground engaging means which support the body and move relative to a ground so as to move the body, driving means supplying an energy to the ground engaging means and thereby driving the ground engaging means relative to the ground so that during movement of the vehicle the body is moved together with the ground engaging means in a traveling direction and at the same time the ground engaging means and the body also displace relative to one another in a substantially vertical direction, and means for converting the displacement of the ground engaging means and the body relative to one another in the substantially vertical direction into an additional energy supplied to the ground engaging means for driving the ground engaging means wherein the converting means includes a stator fixedly connected with the body of the vehicle and a shaft fixedly connected with the ground engaging means and forming a linearly displacing rotor which linearly displaces relative to the stator so as to generate the additional electrical energy.

It is also another feature of the present invention to provide a method of driving the vehicle having a body and ground engaging means which support the body and are movable relative to a ground so as to move the body, the method comprising the steps of supplying an energy to the ground engaging means and thereby driving the ground engaging means relative to the ground so that during movement of the vehicle the body is moved together with the ground engaging means in a traveling direction and at the same time the ground engaging means and the body also displace relative to one another in a traveling direction, converting the displacement of the ground engaging means and the body relative to one another in the substantially vertical direction into an additional energy by attaching a stator to the body of the vehicle and attaching a shaft formed as a linearly displacing rotor to the ground engaging means so that during the displacement of the ground engaging means and the body relative to one another the rotor linearly displaces relative to the stator and the additional electrical energy is generated, and supplying the additional energy to the ground engaging means for driving the ground engaging means.

When the vehicle is designed and the method is performed in accordance with the present invention an additional energy is produced from the substantially vertical relative displacement between the body and the ground engaging means of the vehicle, which energy is utilized to provide a driving force for driving the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
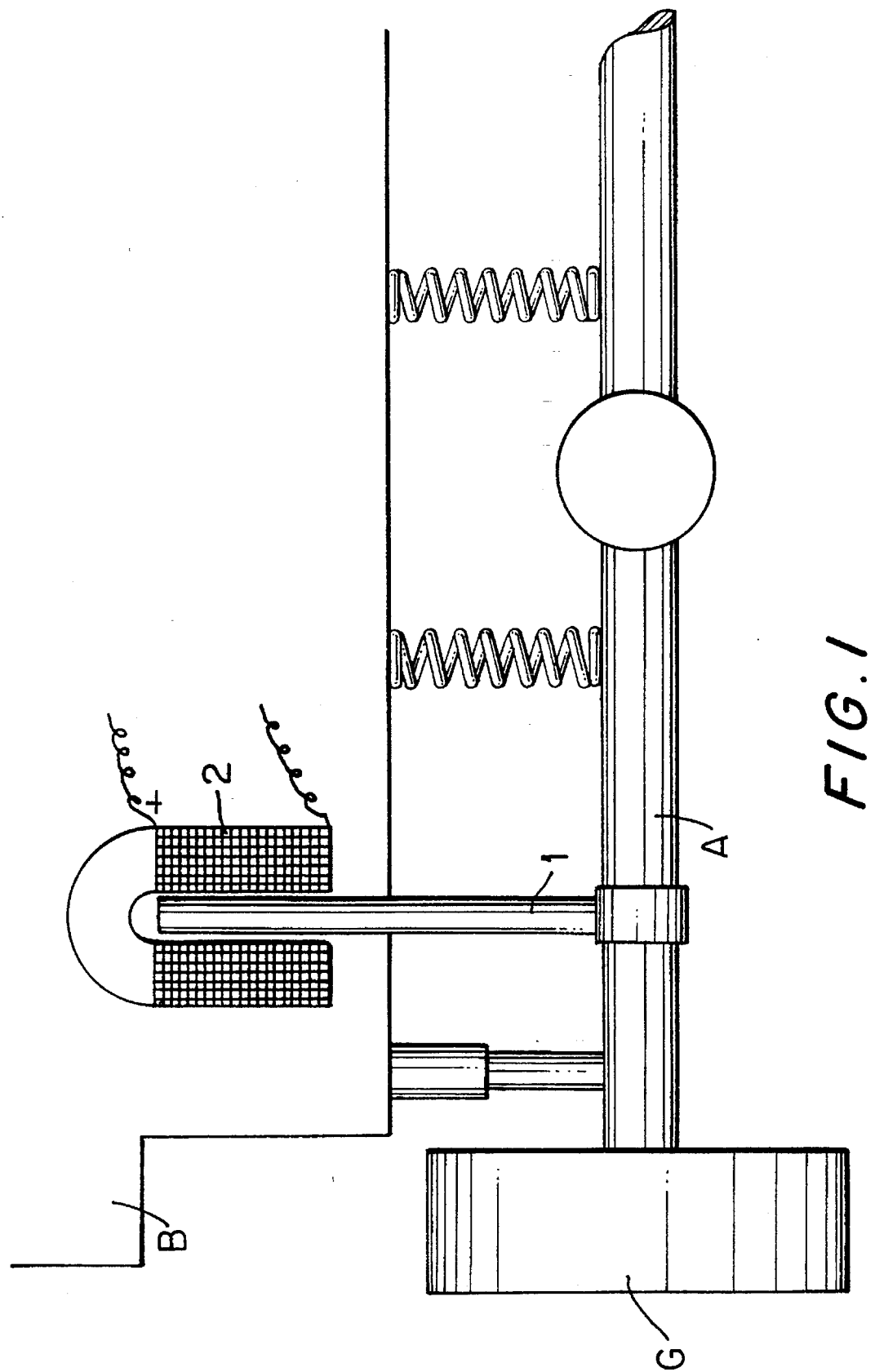
FIG. 1 is a view schematically showing a vehicle in accordance with the present invention.

A vehicle shown in FIG. 1 has a shaft 1 which is fixedly connected with the ground engaging means G, for example the axle A and is formed as a linearly displacing rotor of a linear electric motor. A stator 2 of the linear electric motor is fixedly connected with the body B, for example the chassis of the vehicle. The rotor 1 and the stator 2 of the linear motor are formed in a conventional way as in well known linear motors. When during driving of a vehicle the axle A of the vehicle is moved upwardly and downwardly, the rotor 1 and the stator 2 of the linear motor 1, 2 are displaced relative to one another so that electric current is generated, which can be used as in the embodiment of FIG. 1.

Figure 2:
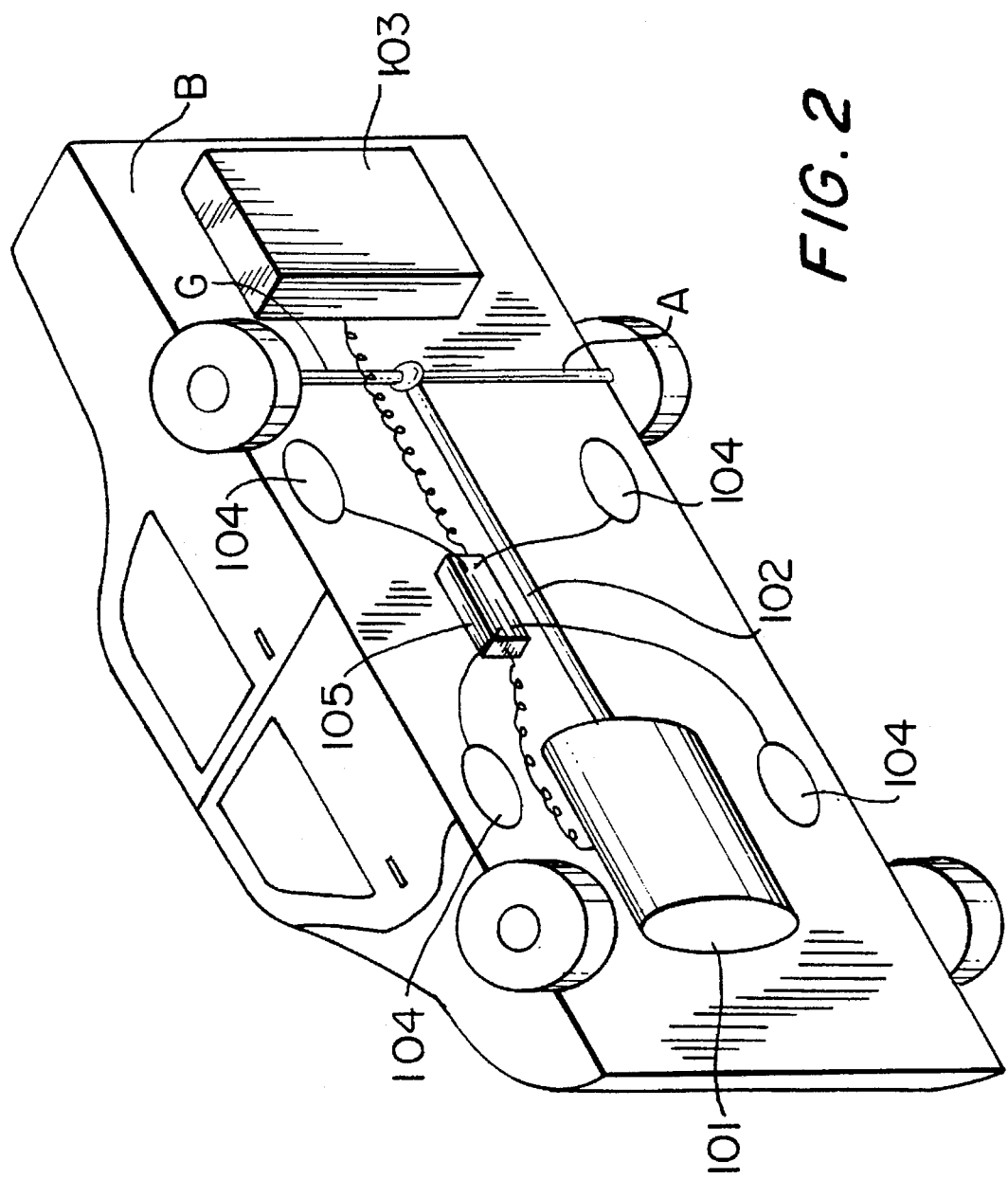
FIG. 2 is a schematic view of an electrically powered vehicle with the inventive elements of the embodiment of FIG. 1.

FIG. 2 shows an electrically powered vehicle which has an electric motor 101, a transmission 102 which connects the electric motor 101 to the ground engaging means, for example the wheel axles A, and an electric battery 103 which supplies current to the electric motor. Reference numerals 104 identify the electrical generator which is shown in FIG. 1. A control unit 105 manages, regulates and directs the electrical energy generated by the generators 104 to either power the electric motor 101, or to recharge the battery 103, or both. During traveling of the vehicle, the electric current is supplied to the electric motor 101 to drive the vehicle. The electric current is supplied from the battery 103, the generator 104 supply electric current to the control unit 105 which in turn directs the electric energy to the electric motor 102 and/or to the battery 103.

It will be understood that each of the elements described above, or two or more together, may also find a useful application in other types of constructions and methods differing from the types described above.

While the invention has been illustrated and described as embodied in a vehicle, and a method of driving the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vehicle, comprising a body; ground engaging means which support said body and move relative to a ground so as to move said body; driving means supplying an energy to said ground engaging means and thereby driving said ground engaging means relative to the ground so that during movement of the vehicle said body is moved together with said ground engaging means in a traveling direction and at the same time said ground engaging means and said body also displace relative to one another in a substantially vertical direction; and means for converting the displacement of said ground engaging means and said body relative to one another in the substantially vertical direction into an additional electrical energy supplied to said ground engaging means for driving said ground engaging means, said converting means including a stator mounted on said body and a shaft formed as a purely linearly displacing rotor and mounted on said ground engaging means so that during the displacement of said ground engaging means and said body relative to one another said rotor purely linearly displaces relative to said stator and thereby the additional electrical energy is generated.

2. A vehicle as defined in claim 1, wherein said driving means is formed as electrically powered driving means, said converting means supplying the additional electrical energy to said electrically powered driving means.

3. A vehicle as defined in claim 2, wherein said electrically powered driving means include at least one electric motor driving said ground engaging means, said converting means supplying the additional electrical energy to said at least one electric motor.

4. A vehicle as defined in claim 2, wherein said electric powered driving means include at least one electric motor for driving said ground engaging means and at least one electrical battery which supplies said electric motor with electric current, said converting means supplying the additional electrical energy to said electrical battery.

5. A method of driving a vehicle having a body and ground engaging means which support said body and are movable relative to a ground so as to move the body, the method comprising the steps of supplying an energy to the ground engaging means and thereby driving the ground engaging means relative to the ground so that during movement of the vehicle the body is moved together with the ground engaging means in a traveling direction and at the same time the ground engaging means and the body also displace relative to one another in a substantially vertical direction; converting the displacement of the ground engaging means and the body relative to one another in the substantially vertical direction into an additional electrical energy by mounting a stator on the body and mounting a purely linearly displacing rotor on the ground engaging means so that during the displacement of the ground engaging means and the body relative to one another said rotor purely linearly displaces relative to said stator and thereby the additional electrical energy is generated; and supplying the additional electrical energy to the ground engaging means for driving the ground engaging means.

* * * * *